(12) United States Patent
Hudebine et al.

(10) Patent No.: US 11,236,403 B2
(45) Date of Patent: Feb. 1, 2022

(54) METHOD FOR TREATING LIGNOCELLULOSIC BIOMASS BY IMPREGNATION AND STEAM EXPLOSION

(71) Applicants: INSTITUT NATIONAL DE LA RECHERCHE AGRONOMIQUE, Paris (FR); IFP Energies nouvelles, Rueil-Malmaison (FR); ARGO INDUSTRIES RECHERCHE ET DEVELOPPEMENT, Pomacle (FR)

(72) Inventors: Damien Hudebine, Lyons (FR); Romain Rousset, Lyons (FR); Olivier Carnnot, Baconnes (FR)

(73) Assignees: INSTITUT NATIONAL DE LA RECHERCHE AGRONOMIQUE, Paris (FR); IFP Energies nouvelles, Rueil-Malmaison (FR); AGRO INDUSTRIES RECHERCHE ET DEVELOPPEMENT, Pomade (FR)

( * ) Notice: Subject to any disclaimer, the term of this patent is extended or adjusted under 35 U.S.C. 154(b) by 397 days.

(21) Appl. No.: 16/318,581

(22) PCT Filed: Jul. 11, 2017

(86) PCT No.: PCT/EP2017/067468
§ 371 (c)(1),
(2) Date: Jan. 17, 2019

(87) PCT Pub. No.: WO2018/015227
PCT Pub. Date: Jan. 25, 2018

(65) Prior Publication Data
US 2019/0241984 A1 Aug. 8, 2019

(30) Foreign Application Priority Data
Jul. 18, 2016 (FR) .................................. 16/56.829

(51) Int. Cl.
*C13K 1/02* (2006.01)
*C08H 8/00* (2010.01)

(52) U.S. Cl.
CPC ................. *C13K 1/02* (2013.01); *C08H 8/00* (2013.01)

(58) Field of Classification Search
None
See application file for complete search history.

(56) References Cited

U.S. PATENT DOCUMENTS 3,115,504 A 12/1963 Arne Johan et al.
8,545,633 B2 10/2013 Nguyen
(Continued)

FOREIGN PATENT DOCUMENTS

EP 2774992 A1 9/2014
FR 2656000 A1 6/1991
(Continued)

OTHER PUBLICATIONS

WO-2014060674-A1—English translation (Year: 2014).*
(Continued)

*Primary Examiner* — Stefanie J Cohen
(74) *Attorney, Agent, or Firm* — Millen, White, Zelano & Branig; John Sopp

(57) ABSTRACT

The invention concerns a continuous method for treating a lignocellulosic biomass before enzymatic hydrolysis, said method comprising a transfer of crushed then pressed biomass to a step of impregnation by an acid liquor, the impregnated biomass dripping over the area containing the impregnation liquor, then the resulting wet biomass is pressed and sent to a steam explosion step. The impregnation liquor is prepared in a dedicated area from the used liquor from the dripping operation and/or that from the pressing operation, prior to the explosion step. The invention also concerns the facility for implementing the method.

15 Claims, 1 Drawing Sheet

(56) References Cited

U.S. PATENT DOCUMENTS

| | | | |
|---|---|---|---|
| 9,187,770 | B2 | 11/2015 | Aymard |
| 9,333,468 | B2 * | 5/2016 | Nguyen ............... B01F 7/16 |
| 10,030,236 | B2 | 7/2018 | Ben Chaabane |
| 2012/0006320 | A1 | 1/2012 | Nguyen |
| 2017/0137848 | A1 | 5/2017 | Lopes Ferreira |

FOREIGN PATENT DOCUMENTS

| | | |
|---|---|---|
| WO | 2013063478 A1 | 10/2012 |
| WO | 2013190214 A1 | 6/2013 |
| WO | 2013124456 A2 | 8/2013 |
| WO | 13141776 A1 | 9/2013 |
| WO | 2013152771 A1 | 10/2013 |
| WO | 2014060674 A1 | 4/2014 |
| WO | WO-2014060674 A1 * 4/2014 ............... C12P 7/14 |
| WO | 2015062736 A1 | 10/2014 |
| WO | 2016001156 A1 | 1/2016 |

OTHER PUBLICATIONS

Wyman, Charles E., "Aqueous Pretreatment of Plant Biomass for Biological and Chemical Conversion to Fuels and Chemicals" John Wiley & Sons, Ltd., 2013; particular relevance: chapter 6 (in parts until 6.4.1) (D10).

Volynets, Bohdan et al., "Assessment of pretreatments and enzymatic hydrolysis of wheat straw as a sugar source for bioprocess industry" International Journal of Energy and Environment, vol. 2, 2011 particular relevance: pp. 427-446 (D11).

Christopher, Lew, "Integrated Forest Biorefineries" Royal Society of Chemistry, 2012; particular relevance: chapter 6 (in parts until 6.2.2) (D12).

Chen, Hongzhang, "Lignocellulose Biorefinery Engineering: Principles and Applications" Elsevier Ltd., 2015; particular relevance: chapter 6.3.1 (D13).

Pandey, Ashok, "Pretreatment of Biomass Processes and Technologies" Elsevier B.V., 2015; particular relevance: chapter 6.6.2 (D14).

Papermaking Science and Technology, "Mechanical Pulping" Fapet Oy, 1999; particular relevance: pp. 165-168, pp. 226 and 227, and pp. 233-236 (D6).

Mekaniska Massor-framstallning och anvandning; excerpt of 20 pages, (1991) Gunnar Graveling (ed.), Skogsindustrins utbildning i Markary (D7) and english translation of relavent parts (D7a).

A drawing depicting a combination of the process in Fig. 2 of U.S. Pat. No. 8,545,633 and the impregnator arrangement of Fig. 3 of WO 2013/141776A1 (D8).

Sixta, Herbert, "Handbook of Pulp" WILEY-VCH Verlag GmbH & Co. KGaA, 2006; particular relevance: section 7 .2.6 p. 627 (D9).

Consolidated reference listing from Opposition proceedings in corresponding EP17737286.9 dated Mar. 19, 2021 (1 page).

International Search Report PCT/EP2017/067468 dated Oct. 19, 2017 (pp. 1-8).

* cited by examiner

FIG 1: Single pump-around (cocurrent) recycling
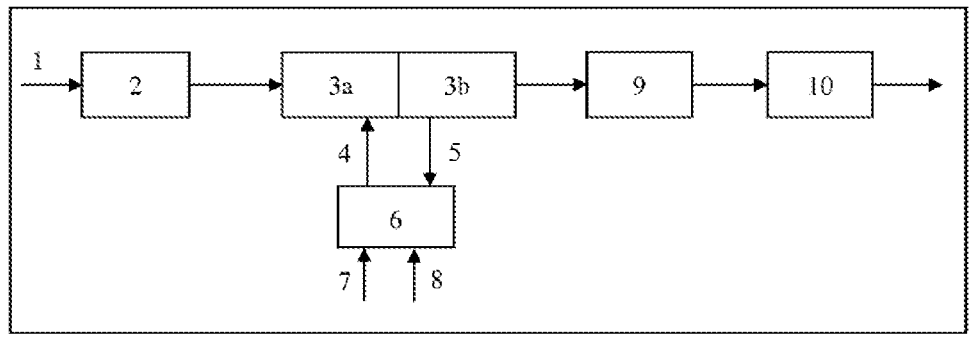
FIG 2: Single recycling after pressing downstream of the impregnation
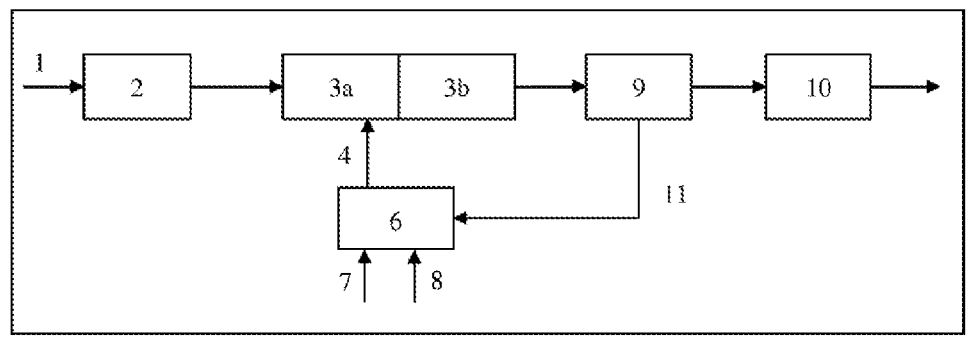
FIG 3: double pump around (cocurrent) and pressate recycling
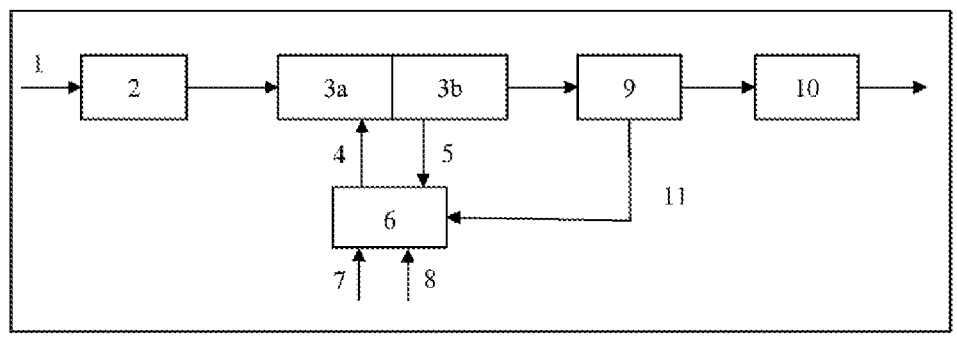

METHOD FOR TREATING LIGNOCELLULOSIC BIOMASS BY IMPREGNATION AND STEAM EXPLOSION

FIELD OF THE INVENTION

The invention relates to a process for treating lignocellulosic biomass for producing second-generation (2G) sugary juices. These sugary juices may be used to produce other products via a biochemical pathway (e.g. alcohols such as ethanol, butanol or other molecules, for example solvents such as acetone, etc.). This process comprises 3 steps which are the liquor preparation, the impregnation of the biomass and the pretreatment of the impregnated biomass by steam explosion.

PRIOR ART

Lignocellulosic biomass represents one of the most abundant renewable resources on earth. The substrates considered are very varied, they relate both to ligneous substrates such as various woods (hardwoods and softwoods), coproducts derived from agriculture (corn stover, corn cobs, etc.) or from other agri-food, paper, etc. industries.

The process for biochemical conversion of the lignocellulosic material into 2G sugary juices comprises in particular a pretreatment step and a step of enzymatic hydrolysis via an enzymatic cocktail. These processes also usually comprise an impregnation step before the pretreatment. The sugary juices resulting from the hydrolysis are then treated, for example by fermentation, and the process also comprises separation steps and/or a step of purification of the final product.

Lignocellulosic biomass is composed of three main polymers: cellulose (35% to 50%), which is a polysaccharide essentially constituted of hexoses; hemicellulose (20% to 30%), which is a polysaccharide essentially constituted of pentoses; and lignin (15% to 25%), which is a polymer of complex structure and of high molecular weight, composed of aromatic alcohols connected by ether bonds. These various molecules are responsible for the intrinsic properties of the plant wall and organize themselves into a complex entanglement.

Among the three base polymers that make up the lignocellulosic biomass, cellulose and hemicellulose are those that enable the production of 2G sugary juices.

Usually, hemicellulose is predominantly broken down into sugar during the pretreatment and cellulose is converted into glucose by enzymatic hydrolysis. However, access to crude cellulose remains difficult for enzymes to access hence the need for a pretreatment. This pretreatment makes it possible to modify the physicochemical properties of the lignocellulosic material in order to improve the accessibility of the cellulose to enzymes and its reactivity to enzymatic hydrolysis.

One of the most effective pretreatments is steam explosion which enables an almost complete hydrolysis of hemicellulose and a significant improvement in the accessibility and the reactivity of cellulose with respect to enzymes. This pretreatment may be preceded by other treatment(s).

U.S. Pat. Nos. 8,057,639 and 8,512,512 propose a process comprising a first step of hydrolysis of hemicellulose to give C5 sugars under mild conditions thus protecting them from the degradation thereof. This step is carried out in a first reactor under pressure of 1.5 bar or more by injection of steam, at a temperature of 110° C. or more, and optionally in the presence of weak acid. After this step, washing is carried out in order to extract and recover the C5 sugar juices before sending the remaining biomass, enriched in cellulose and lignin, to a second step (second reactor) where the steam explosion takes place. This second reactor operates at a higher pressure than the first reactor with an injection of high-pressure steam which causes a sudden expansion of the biomass (steam explosion).

Patent application US-2012/0104313 also proposes a treatment step prior to steam explosion by contacting the biomass with water or steam at 100-210° C. for 1 min-24 h. After separation of the hemicellulose-enriched liquid phase, the solid is then transferred to the steam explosion step.

Patent EP-2610346 describes a process for treating lignocellulosic biomass in 4 steps: a treatment in a liquid at a temperature of 100-150° C., followed by a separation of the liquid/solid, followed by a pretreatment of the solid part obtained at 100-210° C. in the presence of water or steam for 1 min-24 h and ending with a liquid/solid separation.

Many patents proposed various solutions for improving the pretreatment by means of a solubilization of the hemicellulose leading to a better reactivity of the biomass in steam explosion: impregnation at high temperature, impregnation under pressure, in the presence of acid, repetitions of the steps under the same conditions or different conditions.

Patent application WO-2013/141776 describes, in the papermaking field, an impregnation process in a vertical device (impregnator) containing basic impregnation liquor, thus defining a first zone in which the impregnation is carried out. The lignocellulosic material is received at the bottom of the impregnator, it is transferred to the top of the impregnator by means of 2 transfer screws. During its transfer into the second zone of the impregnator located above the level of the liquid, the biomass drains and the liquid falls back into the first zone. In this configuration, the liquid level is controlled by the introduction of basic liquor.

In the improved arrangement, liquid is extracted from the bottom of the impregnator, is filtered then is recycled to the top of the impregnator, so as to create a countercurrent opposite to the direction of travel of the biomass, which makes it possible to discharge impurities (sand, etc.) from the biomass which otherwise are deposited at the bottom of the impregnator. The liquid flows in the loop passing through a filtration system and fresh liquor may be added.

A process is proposed in the present application that uses the impregnator described in application WO-2013/141776, which is adapted to continuous industrial-scale use with a control of the operating conditions. The process according to the invention, and the associated unit, is particularly applicable to processes for producing sugary juices, or even alcohols, from lignocellulosic biomass.

This process is simpler and less expensive than the processes from the prior art in the field of producing sugary juices. It operates at moderate temperature and atmospheric pressure, and preferably in a single impregnation step.

SUMMARY OF THE INVENTION

More specifically, the process according to the invention relates to a continuous process for treating a lignocellulosic biomass for the production of sugary juices, carried out before an enzymatic hydrolysis, the process comprising:
1) a first transfer zone for transferring the milled biomass to a first impregnation zone of the impregnation step, said zones being separated by a plug of biomass preventing liquid upflow from said first impregnation zone to the transfer zone, 2) an impregnation step under atmospheric pressure carried out in 2 superposed impregnation zones operating at a temperature of 10-95° C., the residence time of the biomass in said impregnation step being 1 min-60 min, and said first impregnation zone receives the pressed biomass resulting from the transfer zone and it contains an impregnation liquor having a pH of between 0.1 and 7, and said biomass is transferred to a second impregnation zone, located above said first impregnation zone, in which the impregnated biomass is drained, so as to produce a resulting wet biomass having a total solids content of between 15 wt % and 40 wt %, and a liquor separated from said first impregnation zone, 3) a second transfer zone for transferring the wet biomass to the steam explosion step, said second transfer zone being positioned in a chamber separated, on the one hand, from the impregnation zones of said impregnation step and, on the other hand, from the zones of the steam explosion step, the second impregnation zone and the zones of the steam explosion step being separated in a leaktight manner by a plug of biomass, and in said second transfer zone, the wet biomass is pressed so as to increase the total solids content of the biomass to 40% by weight or more, and produce a resulting liquor, 4) a steam explosion step comprising:

a cooking zone for cooking the biomass for 1-30 min by injection of steam with a specific steam consumption of between 0.05 and 10 tonnes/tonne of biomass total solids entering said zone, said cooking zone being at a temperature of 150-250° C. and a pressure of 0.5-4 MPa, then an expansion zone for expanding the biomass resulting from the cooking zone, then a separation zone for separating the steam from the biomass, 5) a step of preparing the liquor using a liquor preparation device suitable for, receiving liquor extracted from the second transfer zone and/or from the first impregnation zone, receiving inputs of acid and/or water that are determined so as to maintain the pH at the inlet of the first impregnation zone at a value between 0.1 and 7 and in which said prepared liquor is introduced into the first impregnation zone.

The acronym "TS" denotes the total solids content which is measured according to the standard ASTM E1756-08 (2015) "Standard Test Method for Determination of Total Solids in Biomass".

Preferably, in the process according to the invention, the impregnation step is carried out in a single step.

Advantageously, the impregnation step is carried out in 2 impregnation zones positioned vertically one above the other and along the same axis, separated so as to allow the liquor from the second zone to pass to the first zone and so as to retain the biomass in the second zone, the level of the liquid of the first zone ensuring the separation between said 2 zones, said biomass is transferred by means of a screw from said first impregnation zone into said second impregnation zone.

From said second impregnation zone, a portion of the liquor is separated from the impregnated biomass, preferably a portion of the liquor from the impregnated biomass is drained off (is separated by draining) into said first impregnation zone.

It is preferable to keep the liquor level virtually constant by input of acid liquor. Generally, the acid liquor is only a solution of sulfuric acid.

Preferably, the acid liquor has a pH of between 0.1 and 2.

In one embodiment of the step of preparing the acid liquor, the device receives liquor extracted from the second transfer zone and optionally liquor from the first impregnation zone. In one preferred embodiment, the step of preparing the acid liquor receives liquor from the first impregnation zone and liquor extracted from the second transfer zone.

In general, the step of preparing the liquor does not receive liquor separated in or after the steam explosion step.

Generally, the cooking zone is a horizontal tubular reactor, and is provided with one or more screws that transport the biomass from the transfer zone upstream to the expansion zone downstream. The term "horizontal" is understood to mean that there is a slight inclination enabling the flow of the liquid.

Preferably, at least one portion of the biomass resulting from the steam explosion step is subjected to an enzymatic hydrolysis and sugary juices are obtained.

Preferably, at least one portion of the sugary juices is subjected to an alcoholic fermentation, generally with production of ethanol.

The invention also relates to a unit for the continuous treatment of a lignocellulosic biomass before enzymatic hydrolysis, comprising:

1) a first transfer zone for transferring a milled biomass, with pressing, to a first impregnation zone of an impregnation reactor, said zones being separated by a plug of biomass preventing liquid upflow from said first impregnation zone to the first transfer zone, 2) an impregnation reactor comprising 2 superposed impregnation zones, the second impregnation zone being located above the first impregnation zone said first impregnation zone containing an acid liquor and being provided with an inlet opening for the pressed biomass resulting from the first transfer zone, the reactor being provided with a screw that transfers said biomass from an inlet opening in the first transfer zone to the outlet opening of the second impregnation zone, the second impregnation zone located above the liquid of the first impregnation zone being provided with screen(s) that allow the liquid to flow from the second impregnation zone into the first impregnation zone and that retain the wet biomass in the second impregnation zone, 3) a second transfer zone for transferring the wet biomass, with pressing, to a steam explosion zone, said second transfer zone being positioned in a chamber separated, on the one hand, from the impregnation zones and, on the other hand, from the steam explosion zone, the second impregnation zone and the steam explosion zone being separated by a plug of pressed biomass so as to increase the total solids content of the biomass to 40% by weight or more, said plug preventing liquid upflow from the steam explosion zone to the second transfer zone, and said second transfer zone being provided with a line for drawing off the spent liquor separated from the wet biomass during the pressing, 4) a steam explosion zone comprising a screw for transferring the biomass through the following successive zones:
   a biomass cooking zone provided with a line for conveying the pressed biomass resulting from the second transfer zone and a steam injection line,
   an expansion zone for expanding the biomass resulting from the cooking zone,
   a separation zone for separating the steam from the biomass, 5) an acid liquor preparation zone provided
   with a line for conveying the spent liquor drawn off from the second transfer zone to the explosion and/or a line conveying the spent liquor drawn off from the first impregnation zone,
   with a line conveying the acid and/or a line conveying the water
   with a line for recycling said prepared acid liquor to the first impregnation zone,
   with a stirring system and optionally with a heating means.

DETAILED DESCRIPTION

The process according to the invention is a continuous process for treating a lignocellulosic biomass before enzymatic hydrolysis.

It is integrated into processes that aim to produce second-generation sugars from which many biochemical pathways make it possible to obtain oxygenated molecules (for example alcohols such as ethanol, butanol, etc.).

Thus, the present application relates to an integrated process of acid impregnation followed by a pretreatment by steam explosion with recycling and control of the acid impregnation liquor.

This process is compatible with the processes for producing 2G sugars (i.e. those obtained from lignocellulosic biomass) or more broadly biobased molecules (i.e. molecules from natural substrates or derived from natural substrates).

The Biomass and the Transfer Zone

Depending on the biomass (straw, wood, etc.), a step of milling is necessary in order to have a particle size compatible with the technological means and the operating conditions of the steps. For this, a simple chipping may be sufficient but a milling with or without refining may be required.

Generally, the milled biomass has a particle size (the largest size) of at most 300 mm. Usually, the milling of the straws is carried out with screens of from 5 to 100 mm and the wood is chipped into parallelepipedal chips with a length of between 20 and 160 mm, a width of between 10 and 100 mm and a thickness of between 2 and 20 mm.

The milled biomass is conveyed to the first zone of the impregnation step via a first transfer zone. Advantageously, the zones are separated by a plug of biomass which prevents liquid upflow from said first zone to the transfer zone or even further upstream.

According to the invention, the transfer zones with pressing described in the text are provided with a screw, a conical compression zone enabling the formation of a hermetic plug and optionally with a perforated zone enables the outlet of a liquor. When the treated biomass has an initial TS content of less than 70%, a juice resulting from the biomass may be produced in the first transfer zone under the effect of the compression, this juice may then be collected separately from the biomass which is transferred to the first impregnation zone.

One means customarily used for this purpose is a screw referred to as a sealing screw or plug screw known to a person skilled in the art.

This screw has a conical-shaped part, said conical part being connected to the bottom of the first impregnation zone. The plug of biomass is created at the end of this conical part just before the inlet into the first impregnation zone.

This screw thus performs a dual role: on the one hand, the introduction of the biomass continuously into the impregnation reactor and, on the other hand, the formation of a plug in order to achieve leaktightness and prevent leaks of liquor from the impregnation reactor to the screw and upstream of the screw.

Impregnation Step

The impregnation is carried out under atmospheric pressure and at a temperature of 10-95° C. The residence time of the biomass in the impregnation step is customarily of from 1 min-60 min, preferably of at least 2 min, preferably of at least 5 min, preferably of at most 45 min, and usually of 2-35 min. Preferably, it is carried out in a single step.

The step is carried out in an impregnation reactor (or impregnator) of tubular shape which is vertical or inclined with an angle of less than 60° with respect to the vertical. This reactor comprises 2 superposed impregnation zones that are preferably located in the same axis. The bottom zone is referred to as the first impregnation zone and receives, through an opening, the pressed biomass resulting from the first transfer zone. The zone located above (top zone) is referred to as the second impregnation zone, it receives the biomass originating from the first impregnation zone.

The reactor (impregnator) is provided with one or more screws that transfer the biomass via the bottom of the first impregnation zone to the outlet opening by way of the top of the second impregnation zone.

The first impregnation zone (therefore the zone where the impregnation takes place) corresponds to the space filled by the impregnation liquor. The second impregnation zone does not contain a continuous liquid phase. It is particularly advantageous to maintain a constant distribution between the first impregnation zone and the second impregnation zone. In order to do this, the reactor is equipped with a detection system (level sensor), preferably with a system for regulating the level of liquor, that makes possible to guarantee a filling to the desired level.

The impregnation liquor is an aqueous solution having a pH of from 0.1 to 7.0, preferably from 0.1 to 6, or better still from 0.1 to 2, and a temperature of 10-95° C. The acid is generally sulfuric acid. This type of liquor is well known to person skilled in the art and any acid customarily used for impregnation is suitable. The amount of acid and the temperature of the liquor are generally fixed. The means for obtaining and maintaining the temperature are known to a person skilled in the art.

The effect of compressing the biomass during the formation of the plug (at the transfer screw) and of decompressing at the inlet of the first impregnation zone filled with liquor makes it possible to better saturate the biomass (sponge effect). The biomass is transferred across the first zone where it is impregnated toward the second impregnation zone located above the level of the liquor.

In the second impregnation zone, a portion of the impregnated liquor is separated from the impregnated biomass by draining during the rise to the second impregnation zone, the drained liquor falling back into the first impregnation zone.

Preferably, the second impregnation zone is equipped with screen(s) retaining the wet biomass in the second impregnation zone, which screen therefore allows the liquid to flow from the second impregnation zone into the first impregnation zone.

On leaving the second impregnation zone and the impregnation reactor, the impregnated and drained biomass is recovered and contains little or no free water. Its total solids content generally varies between 15% and 40% by weight.

The separated liquor, often referred to as spent liquor, is found in the liquid of the first impregnation zone.

The impregnator is equipped with one or more lines for conveying liquor originating from a liquor preparation zone and also with one or more lines for drawing off liquor. Said liquor inlet and outlet lines are generally installed in an opposite manner between the bottom and the top of the first impregnation zone, which makes it possible to operate with cocurrent or countercurrent recycling.

Preparation of the Impregnation Liquor

Owing to the impregnation, there is a loss of liquor and of acidity. It is therefore necessary to regularly add fresh acid liquor.

These additions make it possible to precisely regulate the level of liquor in the impregnation reactor.

The liquor preparation is also a step that makes it possible to regulate its operating parameters such as, for example, the temperature, the pH or any other characteristic. The appropriate acid concentration is regulated owing to inputs of acid and/or water.

It also makes it possible to produce a homogeneous liquor.

This step is carried out in a liquor preparation zone.

Various devices can be used, such as for example a mixing tank equipped with a stirring system or a mixer (preferably a static mixer).

Preferably, the device is equipped with sensors for measuring the pH and the flow rate for the water, acid, spent liquor and prepared liquor, etc.

All of these sensors makes it possible to put in place a control that balances the flow rates and the acidities so as to have a continuous operation that is stable under the desired conditions.

The liquor preparation device and/or the impregnator is (are) equipped in order to carry out the heating by means for example of a jacket, coils and/or exchangers positioned on the recirculation loop (described below) next to or directly on said devices (tank, mixer, etc.).

The device used for the preparation of the liquor is connected to the impregnator by one or more lines that transport the liquor.

The liquor may thus be prepared with the appropriate concentration and appropriate flow rate that make it possible to obtain the determined pH (or any other characteristic) which may be the setpoint value for the control, etc. The control means, which are known to person skilled in the art, will not be described in detail.

Generally, the acid liquor preparation zone is provided
  with a line conveying the spent liquor drawn off from the second transfer zone to the steam explosion zone and/or with a line conveying the spent liquor drawn off from the first impregnation zone,
  with a line conveying the acid and/or a line conveying the water
  with a line for recycling said prepared acid liquor to the first impregnation zone,
  with a stirring system and optionally with a heating means.

Examples of a recirculation loop are presented below.

Single Recirculation Loop Referred to as a Pump-Around Recycling Loop

A liquor recirculation loop may advantageously be arranged around the first zone of the impregnation step and which is commonly referred to as a pump around loop since it is a question of withdrawing and recycling in the same zone.

There are two reinjection possibilities: cocurrent (injection at the bottom and drawing off at the top) or countercurrent (injection at the top and drawing off at the bottom). This loop makes it possible to have a better homogeneity and stability of the liquor, a better contact of the liquor with the biomass and also makes it possible to regulate the liquor level of the first impregnation zone.

Preferably, the liquor is drawn off in the vicinity of the liquid level of the first impregnation zone after separation of the biomass. This liquor is drawn off at a location where the concentration of spent liquor is high, so that, in the liquor preparation zone, its characteristics are adjusted to those of the fresh liquor.

Before its return, the spent liquor specifically passes through the liquor preparation step where acid and/or water are added thereto in appropriate proportions.

This arrangement makes it possible to considerably improve the homogeneity of the liquor in the first impregnation zone, to have a more effective contact between the biomass and the liquor and to be able to have a higher temperature in the first zone. In this case, the advantage is to have reduced differences between the characteristics of the fresh liquors and of the spent liquors.

The characteristics of the liquor entering the preparation step are measured by means of sensors (of pH, flow rate, etc.) and the amounts of water and/or acid to be added are determined by the control system in order to reach the setpoint value(s), for example the pH of the liquid to be recycled into the first impregnation zone.

BRIEF DESCRIPTION OF THE DRAWINGS

FIG. 1 illustrates operation of the invention with single pump-around (cocurrent) recycling loop FIG. 2 illustrates operation of the invention single recycling after pressing downstream of the impregnation FIG. 3 illustrates operation of the invention with double pump-around (cocurrent) and pressate recycling

DESCRIPTION OF THE FIGURES WHICH WILL BE FOLLOWED USING THE FOLLOWING REFERENCES

FIG. 1: Single Pump-Around (Cocurrent) Recycling
1: milled biomass
2: 1st transfer zone/step
3a: impregnator, first zone
3b: impregnator, second zone
5: liquor drawn off from the impregnator for cocurrent pump-around recycling
4: liquor injected into the impregnator for cocurrent pump-around recycling
6: liquor preparation device (tank)
7: make-up water into the liquor preparation tank
8: make-up acid into the liquor preparation tank
9: second transfer zone/step 10: downstream of the impregnation process (pretreatment by steam explosion).

FIG. 2: Single Recycling after Pressing Downstream of the Impregnation
1: milled biomass
2: first transfer zone/step
3a: impregnator, first zone
3b: impregnator, second zone
4: liquor injected into the impregnator for cocurrent pump-around recycling
6: liquor preparation tank
7: line for make-up water into the liquor preparation tank
8: line for make-up acid into the liquor preparation tank
9: second transfer zone/step
10: downstream of the impregnation process (pretreatment by steam explosion)
11: liquor drawn off by pressing (pressate) after impregnation in second transfer zone FIG. 3: Double Pump-Around (Cocurrent) and Pressate Recycling
1: milled biomass
2: first transfer zone/step
3a: impregnator, first zone
3b: impregnator, second zone
4: liquor injected into the impregnator for cocurrent pump-around recycling
5: liquor drawn off from the impregnator for cocurrent pump-around recycling
6: liquor preparation tank
7: make-up water into the liquor preparation tank
8: line for make-up acid into the liquor preparation tank
9: second transfer zone/step
10: downstream of the impregnation process (pretreatment by steam explosion)
11: liquor drawn off by pressing (pressate) after impregnation in second transfer zone.

FIG. 1 illustrates the operation of this loop.

The milled biomass is introduced via the line 1 into the process and transferred (first transfer zone 2) into the impregnator 3 and more specifically into the first impregnation zone 3a of the impregnator. This zone contains liquid conveyed by the line 4 and which originates from the liquor preparation device (step) 6. This device 6 receives, via the line 5, the liquor originating from the second impregnation zone 3b of the impregnator and which has been separated from the biomass, and is provided with lines 7 and 8 for the addition of water and acid respectively. The wet biomass obtained after separation of the liquid is transferred from the second transfer zone 9 to the next step of the process, which is usually a step of pretreatment by steam explosion, carried out for example in the zone 10.

Single Recirculation Loop with One or More Other Downstream Liquid Streams

Other liquid streams separated after the impregnation step (or after the impregnator), and more specifically after the second impregnation zone of this step, may also be recycled as impregnation after passing through the liquor preparation step (device). Advantageously, the characteristics of the stream are measured by sensors (of flow rate, pH, etc.) before introducing the stream into the preparation step. The control of the device enables the addition of water and/or of acid in the correct proportions for preparing the liquor with appropriate characteristics. Preferably, said stream is the pressate (liquid resulting from the second transfer zone for transferring wet biomass to the steam explosion step). Indeed, this stream is a spent liquor that still contains acid which is therefore recoverable.

The operation of a recycling of liquid downstream of the impregnation is the following (with reference to FIG. 2): the description and the references commented upon for FIG. 1 will not be repeated when they are identical.

In FIG. 2, a line 11 conveys the pressate to the liquor preparation step. The pressate originates from the second transfer zone 9 (for transferring the wet biomass to the steam explosion zone).

However, in this arrangement from FIG. 2, the spent liquor separated from the biomass in the second impregnation zone of the impregnator is not sent to the liquor preparation step.

This arrangement is preferably used when there is little difference between the fresh liquor entering the first zone and the spent liquor separated from the biomass in the pressate (or more generally in this other stream).

Recirculation Loop Referred to as a Double Recycling Loop

It combines the preceding 2 recycling loops in order to benefit from the combined advantages thereof.

FIG. 3 illustrates the operation of a double recycling. The descriptions of the preceding figures, which are identical, will not be repeated.

Thus, in FIGS. 1 and 3, the spent liquor 5 of the first impregnation zone of the impregnator makes a loop by passing through the liquor preparation zone. This recycling may take place cocurrent or countercurrent to the circulation of the biomass in the first impregnation zone of the impregnator.

Similarly, the downstream liquor 11 (which is for example the pressate resulting from the second transfer zone) is sent to the preparation zone. Thus, the liquor preparation zone receives two (or more) spent liquors and makes it possible to mix them.

The sensors cited above send information necessary for determining the appropriate amounts of water and acid to be added in order to obtain a recycled liquor having the pH and flow rate that are desired for the first zone of the impregnator.

According to the invention, the liquor preparation step may therefore be carried out in various ways:
  with withdrawal of liquor from the impregnator and recycling of liquor into the first impregnation zone of the impregnator;
  with withdrawal of one or more liquids present downstream of the impregnation (such as the pressate) and recycling into the first impregnation zone of the impregnator; this arrangement is advantageous, especially in the case where there is little difference in characteristics between the downstream liquor and the fresh liquor,
  with double recycling, i.e. with withdrawal of liquor from the impregnator and recycling of liquor into the first impregnation zone of the impregnator and also withdrawal of one or more liquids present downstream of the impregnation and recycling into the first impregnation zone of the impregnator. This arrangement is widely preferred.

Zone for Transferring with Pressing to the Steam Explosion Step

The wet biomass resulting from the second impregnation zone of the impregnation step is transferred continuously to the steam explosion step via a second transfer zone.

The second transfer zone is separate from the impregnation zones and is not positioned in the chamber of one or other of the impregnation zones. For example, in the case of an impregnator comprising 2 zones (impregnation and draining zones), the transfer zone is outside of the impregnator.

This second transfer zone is also separate from the steam explosion zones.

In the same way as in the first transfer zone conveying the biomass to the impregnation step, the second impregnation zone and the reactor where the steam explosion step takes place are separated by a plug of biomass. Said plug prevents liquid upflow from the steam explosion zones first zone to the transfer zone or even further upstream.

This leaktightness is ensured in the second transfer zone between said second impregnation zone of the impregnation step and the first zone of the steam explosion step.

One means customarily used for this purpose is a screw referred to as plug screw known to a person skilled in the art. The conical part of the screw is here connected to the first steam explosion zone. The non-conical part is connected to said second impregnation zone.

The formation of a plug of biomass ensures the leaktightness to the pressure of the steam explosion reactor, thus preventing dangerous escapes of steam.

In said second transfer zone, the wet biomass is pressed so as to increase the TS content of the biomass. The total solids content of the biomass achieved is generally at least 40% by weight, preferably it is greater than 40% by weight and even more preferably it is from 40% by weight to 70% by weight.

The second transfer zone is also provided with a line for drawing off the spent liquor (referred to as pressate) separated from the wet biomass during the pressing.

The spent liquor is advantageously recycled into the impregnation step, as was described above.

It should be noted that the drained biomass does not undergo a mechanical treatment before hydrolysis that aims to reduce the sizes.

The Steam Explosion Step Carried Out in a Steam Explosion Zone

It generally employs:
- a cooking zone, in which the biomass is bought into contact for 1-30 min with steam with a specific steam consumption of 0.05-10 tonnes/tonne of biomass total solids, said zone being at a temperature of 150-250° C. and a pressure of 0.5-4 MPa,
- then an expansion zone for expanding the biomass resulting from the cooking zone,
- then a separation zone for separating the steam from the biomass.

The steam recovered is advantageously recycled after compression to the steam explosion step, or optionally is recycled to the utilities of the site.

Preferably, this step is carried out in a tubular reactor that is horizontal (i.e. which may be very slightly inclined for the flow of the liquid).

The biomass cooking zone is provided with a line for conveying the pressed biomass resulting from the second transfer zone and a steam injection line. The cooking is carried out at high temperature and under pressure. This pressurization is carried out by injection of steam so as to achieve a pressure of 0.5-4 MPa. The cooking temperature is generally 150-250° C. Preferably, the conditions are regulated so that the cooking time is limited to 1-30 min.

This step employs a reactor which is provided with a screw for transferring the biomass through the successive zones. The screw ensures the transport of the biomass continuously, the speed of the screw being regulated in order to fulfil the residence time conditions.

At the end of the screw (at the end of the reactor), the biomass is entrained very rapidly by the steam to an expansion zone in a line referred to as a blowline which has a reduced diameter relative to the cooking zone.

The expansion zone comprises a line in which the biomass circulates and passes through a cross section restriction member then, after having cleared the restriction, undergoes an abrupt expansion.

The blowline has a cross section restriction member which may be an orifice or a valve with an adjustable opening (diaphragm valve for example) that allows a small flow area. At this restriction, the biomass arrives with a very high transport speed, and undergoes a rapid and large pressure variation, then an abrupt expansion after having cleared the restriction, which destructures the cooked biomass. This is why it is referred to as steam explosion.

This restriction sets the steam flow rate and therefore the specific steam consumption (steam flow rate/dry biomass flow rate). Generally, this specific steam consumption is 0.05-10 tonnes/tonne of total solids.

Once the expansion zone is passed, the biomass is entrained by the steam through the remainder of the blowline which has a larger diameter than the restriction (or which returns to its diameter upstream of the restriction) and which conveys the biomass to a zone for separating the steam, for example via a cyclone.

The exploded biomass resulting from the separation zone now has a sufficient accessibility of the cellulose to enzymes in order to be treated by enzymatic hydrolysis for the production of 2G sugars.

The conditions of the enzymatic hydrolysis and of the consecutive or spontaneous fermentation are suitable for the desired products and are known to a person skilled in the art.

This process according to the invention finds a particular advantageous application in a process for preparing sugars from lignocellulosic biomass and in the process for producing ethanol from said sugary juices.

Such processes are known. A process for preparing sugars from lignocellulosic biomass comprises a pretreatment, which is advantageously a steam explosion, followed by an enzymatic hydrolysis. The process for producing ethanol from sugars further comprises an alcoholic fermentation of said sugars.

In a process according to the invention, at least one portion of the biomass resulting from the steam explosion step is subjected to an enzymatic hydrolysis and sugary juices are obtained. Preferably, said biomass is introduced without an intermediate mechanical step into the enzymatic hydrolysis reactor.

In a process according to the invention, at least one portion of the biomass resulting from the steam explosion step is subjected to an enzymatic hydrolysis, sugary juices are obtained and at least one portion of the sugary juices is subjected to an alcoholic fermentation.

EXAMPLES

In the examples described below, the acronym "TS" denotes the total solids content which is measured according to the standard ASTM E1756-08(2015) "Standard Test Method for Determination of Total Solids in Biomass".

Example 1 (Comparative)

In this example 1, the biomass treated is straw previously milled on a 50 mm screen. The milled straw has a TS of 90.2% and a glucose content estimated at 39.9 g per 100 g of TS and a xylose content estimated at 26.6 g per 100 g of TS.

The straw is treated according to a process not in accordance with the invention.

In a first step, the milled straw is bought into contact in tanks over 4 hours with an acid liquor preheated to 70° C. The contacting operation (impregnation of the liquor) is carried out in batch mode in the following manner: a tank with a capacity of 1 m³ is filled with 62.1 kg of milled straw (i.e. 56 kg TS), then the screen is positioned on the milled straw and weighted down with 4 weights of 2 kg each. 685 kg of acid liquor containing 4.72 kg of $H_2SO_4$ acid and the remainder of water, are then introduced into the tank. After 4 hours of contact, the tank is emptied by gravity drainage. The mean amount of liquor extracted is 469 kg. The drained biomass is then transferred into a buffer hopper, then poured onto a conveyor belt and finally introduced into a conical screw conveyor for transfer to the cooking tool continuously, at a mean flow rate of 203.2 kg/h. In order to maintain the feed rate, a tank is prepared every 82 minutes. During the passage in the conical screw conveyor, a plug of biomass is formed, ensuring the leaktightness with the cooking reactor maintained at 190° C. Liquid is extracted from the biomass during the compression thereof in the conical screw conveyor, at a rate of 133.6 kg/h on average. The cooking reactor is maintained at 190° C. by addition of steam, at a mean flow rate of 384.7 kg/h. On leaving the reactor, the biomass is rapidly depressurized and collected in a tank at atmospheric pressure. During the transfer between the cooking reactor and the collection tank, the pretreated substrate is separated from the gas phase in a cyclone. The collected flow rate of biomass thus pretreated is 85.5 kg/h. Its TS is measured at 40.7%. The vapors separated at the top of the cyclone are condensed and a condensate is collected with a mean flow rate of 368.8 kg/h.

The pretreated biomass has a potential xylose content of 20.2 g per 100 g TS, of which 17.5 g per 100 g TS are in the form of xylose monomer and soluble oligomers. Thus, the xylose balance shows a conversion of 91.3% of the xylose initially present. The process of example 1, not in accordance with the invention, requires the following specific consumptions (relative to 1 kg TS treated)
water: 12.14 kg of water/kg TS treated
sulfuric acid: 84.3 g/kg TS treated
steam: 9.4 kg/kg TS treated Furthermore, the process of example 1 has considerable equipment requirements: a minimum volume for the contacting of 2.2 m³. The volume to be pumped in order to fill the contacting tanks is around 0.5 m³/h.

Example 2 (in Accordance with the Invention)

In example 2, the biomass treated is straw identical to that of example 1. The milled biomass is introduced at a mean flow rate of 45.4 kg/h into the impregnation tool via a first transfer zone in which it is compressed. The compressed biomass is introduced into an impregnation tool having a working height of 2 meters, equipped with two parallel screws enabling a vertical conveying of the biomass at an equivalent linear velocity of 106 m/h. The total working volume of the impregnation tool is 78 liters, with a volume of the first impregnation zone (referred to as submerged zone) of 45 liters. At 5 cm below the liquid level, 412 kg/h of acid liquor are added, this acid liquor originates from a zone for preparing said liquor. The temperature of the acid liquor injected is 80° C. Thus, in the first impregnation zone, the biomass is bought into contact with an acid liquor. The mean temperature in the first impregnation zone is 73.5° C.

At the bottom of the impregnation tool, liquid is drawn off (spent liquor), at a flow rate of 232.1 kg/h. In accordance with the invention, this liquid is sent back to the liquor preparation zone The impregnated biomass leaves by the top of the impregnation reactor with a flow rate of 225.3 kg/h.

Into the zone for preparing the acid liquor, three streams are thus conveyed: the spent liquor drawn off from the impregnation tool (at a rate of 232.1 kg/h), the sulfuric acid (expressed as 100% by weight equivalent) at a flow rate of 2.52 kg/h, and the water at a flow rate of 177.4 kg/h. These incoming streams are mixed in a stirred tank having a unit volume of 560 liters, the prepared liquor is drawn off (at a rate of 412 kg/h), sent to a heat exchanger in order to heat it to the temperature of 80° C., then injected into the impregnation tool as described above.

The straw impregnated with acid liquor is then conveyed on a belt then transferred into the cooking tool via a transfer zone in a conical screw. During this transfer, a liquid (spent liquor) flows at a flow rate of 127.8 kg/h.

In the cooking reactor, steam is injected at a flow rate of 347 kg/h. This injection of steam makes it possible to maintain the temperature of the reactor at 190° C. On leaving the reactor, the biomass is rapidly depressurized and collected in a tank at atmospheric pressure. During the transfer between the cooking reactor and the collection tank, the pretreated substrate is separated from the gas phase in a cyclone. The collected flow rate of substrate thus pretreated is 92.8 kg/h. Its TS is measured at 38.5%. The vapors separated at the top of the cyclone are condensed so as to produce a condensate with a condensate flow rate of 351.8 kg/h.

The pretreated substrate has a potential xylose content of 19.8 g per 100 g TS, of which 17.3 g per 100 g TS are in the form of xylose monomer and soluble oligomers. Thus, the xylose balance shows a conversion of 91.7% of the xylose initially present.

The process of example 2, in accordance with the invention, requires the following specific consumptions (relative to 1 kg TS treated)
water: 4.34 kg of water/kg TS treated
sulfuric acid: 61.5 g/kg TS treated
steam: 8.5 kg/kg TS treated Thus, the process according to the invention of example 2 makes it possible to achieve the same degrees of conversion of the xylose in the pre-treatment step as example 1 while ensuring a significant reduction of the consumptions of water and acid, respectively a 64% reduction in the consumption of water and a 27% reduction in the consumption of acid.

Furthermore, the process of example 2 has reduced equipment requirements: a minimum volume for the impregnation of the acid liquor of less than 1 m³ including the liquor preparation tank and the impregnation tool. The volume to be pumped for pumping and drawing off the liquors around the impregnation is around 0.6 m³/h.

Example 3 (in Accordance with the Invention)

Example 3 uses poplar wood as biomass in the form of chips having a mean size of 50 mm long and 10 mm thick and the initial TS content of which is 55.7%. Before its treatment, the biomass is at ambient temperature, i.e. around 20° C.

The biomass is introduced into the same impregnation tool as example 2, via a first transfer zone at a mean flow rate of 140.2 kg/h. The compressed biomass is introduced into an impregnation tool having a working height of 2 meters, equipped with two parallel screws enabling a vertical conveying of the biomass at an equivalent linear velocity of 106 m/h. At the bottom of the impregnation tool, 163.9 kg/h of acid liquor are added, this acid liquor originates from a preparation zone. The temperature of the acid liquor injected is 80° C. Thus, in the first impregnation zone, the biomass is bought into contact with an acid liquor. The mean temperature in the first impregnation zone is 55.9° C. On leaving the impregnation tool, the impregnated biomass is extracted at a flow rate of 304 kg/h. Its TS is measured at 27.1% TS according to the standard ASTM E1756.

The impregnated biomass is then conveyed on a belt then transferred into the cooking tool via a transfer zone in a conical screw. During this transfer, a liquid (spent acid liquor) flows at a flow rate of 161.7 kg/h. In accordance with the invention, this liquid referred to as pressate, is collected and pumped to the acid liquor preparation zone. In the cooking reactor, steam is injected at a flow rate of 416.9 kg/h. This injection of steam makes it possible to maintain the temperature and the pressure of the reactor, at 200° C. and 1.49 MPa respectively. On leaving the cooking reactor, the biomass is rapidly depressurized and collected in a tank at atmospheric pressure. During the transfer between the cooking reactor and the collection tank, the pretreated substrate is separated from the gas phase in a cyclone. The collected flow rate of substrate thus pretreated is 145.9 kg/h. Its TS is measured at 49.9%. The vapors separated at the top of the cyclone are condensed so as to produce a condensate with a flow rate of around 413.3 kg/h.

The pressate extracted from the second transfer zone for transferring to the cooking reactor is sent to the liquor preparation zone. This zone consists of a mixing tank and a heat exchanger. The mixing tank is fed by a line for make-up of water, a line for make-up of concentrated $H_2SO_4$ acid solution and a line conveying the recycled pressate, and has a line for drawing off prepared liquor. The heat exchanger is placed on the prepared liquor line, going from the mixing tank to the impregnator and therefore makes it possible to reheat the liquid leaving the tank and to control the temperature of the liquor introduced into the impregnation tool independently of the temperature of the mixing tank and of its inputs. In the configuration used, the make-ups of water and of $H_2SO_4$ (100%) are respectively 1.2 kg/h and 1 kg/h. The outlet temperature of the exchanger is 80° C. for the acid liquor. Thus, the implementation of the process according to the invention makes it possible to treat the wood with minimized consumptions of acid and of water. Specific consumption of acid is 12.8 g/kg of incoming TS and the specific consumption of water is 15.4 g/kg TS.

Example 4 (in Accordance with the Invention)

Example 4 treats the same poplar wood as example 3. The process thus treats a nominal flow rate of 140.2 kg/h of poplar wood in the form of chips having a mean size of 50 mm long and 10 mm thick, the initial TS content of which is 55.7% and which was stored before treatment at a temperature of 20° C. The biomass is introduced into the same impregnation tool as example 2 via a first transfer zone. The compressed biomass is introduced into an impregnation tool having a working height of 2 meters, equipped with two parallel screws enabling a vertical conveying of the biomass at an equivalent linear velocity of 106 m/h. At the bottom of the impregnation tool, 570 kg/h of acid liquor are added, this acid liquor originating from a liquor preparation zone. The temperature of the acid liquor injected is 80° C. Thus, in the impregnation tool, the transferred biomass is bought into contact with an acid liquor. At 15 cm below the liquid level, spent liquor is drawn off, at a flow rate of 407 kg/h. This spent liquor is sent to the liquor preparation zone in accordance with the invention.

The mean temperature in the first impregnation zone is 70.1° C. On leaving the impregnation tool, the impregnated biomass is extracted at a flow rate of 303.1 kg/h. Its TS is measured at 27.2% according to the standard ASTM E1756.

The impregnated biomass is then conveyed on a belt then transferred into the cooking tool via a transfer zone in a conical screw. During this transfer, a liquid (spent liquor) flows at a flow rate of 161.7 kg/h. This liquid, referred to as pressate, is collected and pumped to the acid liquor preparation zone. In the cooking reactor, steam is injected at a flow rate of 414.2 kg/h. This injection of steam makes it possible to maintain the temperature and the pressure of the reactor, at 200° C. and 1.49 MPa respectively. On leaving the reactor, the biomass is rapidly depressurized and collected in a tank at atmospheric pressure. During the transfer between the cooking reactor and the collection tank, the pretreated biomass is separated from the gas phase in a cyclone. The collected flow rate of pretreated biomass is 142.5 kg/h. Its TS is measured at 51.1%. The vapours separated at the top of the cyclone are condensed providing a condensate having a flow rate of 413.1 kg/h.

In accordance with the invention, the pressate extracted from the second transfer zone for transferring to the cooking reactor is sent to the liquor preparation zone. This zone consists of a mixing tank and a heat exchanger. The mixing tank is fed by a line for make-up of water, a line for make-up of concentrated $H_2SO_4$ acid solution, a line conveying the recycled pressate, and a line conveying the liquor drawn off from the first impregnation zone. The tank also has a line for drawing off prepared liquor. The contents of the mixing tank is maintained at 1100 kg. The heat exchanger is placed on the prepared liquor line, going from the mixing tank to the impregnator and therefore makes it possible to reheat the liquid leaving the tank and to control the temperature of the liquor introduced into the impregnation tool independently of the temperature of the mixing tank and of its inputs. In the configuration used, the make-ups of water and of $H_2SO_4$ are respectively 1.2 kg/h and 1 kg/h. The outlet temperature of the exchanger is 80° C. for the acid liquor.

Thus, the setting up of a drawing-off of the spent liquor in the first impregnation zone and a drawing-off of the pressate with the recycling thereof into the liquor preparation tank makes it possible to increase the temperature in the first impregnation zone by 14.2° C. while maintaining the temperature heating the liquor prepared at 80° C., i.e. below the bubble point of said liquor.

The invention claimed is:
1. A continuous process for treating a lignocellulosic biomass for the production of sugary juices, carried out before an enzymatic hydrolysis, the process comprising:
   1) in a first transfer zone, transferring a milled biomass to a first impregnation zone of an impregnation step, said first transfer zone and first impregnation zone being separated by a plug of biomass preventing liquid upflow from said first impregnation zone to the first transfer zone,
   2) carrying out the impregnation step under atmospheric pressure in 2 superposed impregnation zones operating at a temperature of 10-95° C., the residence time of the biomass in said step being 1 min-60 min, and said first impregnation zone receives the pressed biomass resulting from the first transfer zone and it contains an impregnation liquor having a pH of between 0.1 and 7, and transferring said biomass to a second impregnation zone, located above said first impregnation zone, in which the impregnated biomass is drained, so as to produce a resulting wet biomass having a total solids content of between 15 wt % and 40 wt %, and a separate liquor, 3) in a second transfer zone, transferring the wet biomass to a steam explosion step, the steam explosion step having each of a cooking zone which comprises a reactor, an expansion zone and a separating zone, said second transfer zone being positioned in a chamber separated, on the one hand, from the impregnation zones of said impregnation step and, on the other hand, from the zones of the steam explosion step, the second impregnation zone and the reactor of the steam explosion step being separated in a leaktight manner by a plug of biomass, and in said second transfer zone, pressing the wet biomass so as to increase the total solids content of the biomass to 40% by weight or more, and produce a resulting liquor, 4) a steam explosion step comprising cooking the biomass in the cooking zone for 1-30 min by injection of steam with a specific steam consumption of between 0.05 and 10 tonnes/tonne of biomass total solids entering said zone, said cooking zone being at a temperature of 150-250° C. and a pressure of 0.5-4 MPa, then, in the expansion zone, expanding the biomass resulting from the cooking zone, then, in the separation zone, separating the steam from the biomass, 5) a step of producing an acid liquor using a preparation device suitable for, receiving the resulting liquor from the second transfer zone and/or from the first impregnation zone, and receiving inputs of acid and/or water that are determined so as to maintain the pH at the inlet of the first impregnation zone at a value between 0.1 and 7, and introducing said acid liquor into the first impregnation zone.

2. The process as claimed in claim 1, wherein said impregnation step is carried out in a single step.

3. The process as claimed in claim 1, wherein:

the impregnation step is carried out in 2 impregnation zones positioned vertically one above the other and along the same axis, separated so as to allow the liquor from the second zone to pass to the first impregnation zone and so as to retain the biomass in the second impregnation zone, the level of the liquid of the first impregnation zone ensuring the separation between said 2 zones, and said biomass is transferred by means of a screw from said first impregnation zone into said second impregnation zone.

4. The process as claimed in claim 1, wherein the liquor level is kept constant by input of acid liquor.

5. The process as claimed in claim 1, wherein the acid liquor is only a solution of sulfuric acid.

6. The process as claimed in claim 1, wherein the acid liquor has a pH of between 0.1 and 2.

7. The process as claimed in claim 1, wherein said step of preparing the acid liquor receives liquor extracted from the second transfer zone and optionally liquor from the first impregnation zone.

8. The process as claimed in claim 1, wherein said step of preparing the acid liquor receives liquor from the first impregnation zone and optionally liquor extracted from the second transfer zone.

9. The process as claimed in claim 1, wherein, in said second transfer zone for transferring the wet biomass, the total solids content of the biomass after pressing is between 40% and 70% by weight.

10. The process as claimed in claim 1, wherein the cooking zone is a horizontal tubular reactor, and is provided with one or more screws that transport the biomass from the second transfer zone upstream to the expansion zone downstream.

11. The process as claimed in claim 1, wherein the milled biomass has a size of at most 300 mm.

12. The process as claimed in claim 1, wherein at least one portion of the biomass resulting from the steam explosion step is subjected to an enzymatic hydrolysis and sugary juices are obtained.

13. The process as claimed in claim 12, in which at least one portion of the sugary juices is subjected to an alcoholic fermentation.

14. The process as claimed in claim 1, wherein, in said second transfer zone for transferring the wet biomass, the total solids content of the biomass after pressing is greater than 40%.

15. A unit for the continuous treatment of a lignocellulosic biomass before enzymatic hydrolysis, comprising:

1) a first transfer zone for transferring a milled biomass, with pressing, to a first impregnation zone of an impregnation reactor, said first transfer and first impregnation zones being separated by a plug of biomass preventing liquid upflow from said first impregnation zone to the first transfer zone, 2) an impregnation reactor comprising 2 superposed impregnation zones, the second impregnation zone being located above the first impregnation zone said first impregnation zone containing an acid liquor and being provided with an inlet opening for the pressed biomass resulting from the first transfer zone, the impregnation reactor being provided with a screw that transfers said biomass from said inlet opening in the first impregnation zone to an outlet opening of the second impregnation zone, the second impregnation zone located above the liquor of the first impregnation zone and being provided with screen(s) that allow the liquid to flow from the second impregnation zone into the first impregnation zone and that retain a wet biomass wetted by the liquor in the second zone, 3) a second transfer zone for transferring the wet biomass, with pressing, to a steam explosion zone, said second transfer zone being positioned in a chamber separated, on the one hand, from the impregnation zones and, on the other hand, from the steam explosion zone, the second impregnation zone and the steam explosion zone being separated by a plug of pressed biomass so as to increase the total solids content of the biomass to 40% by weight or more, said plug preventing liquid upflow from said first zone to the second transfer zone, and said second transfer zone being provided with a line for drawing off the spent liquor separated from the wet biomass during the pressing, 4) the steam explosion zone comprising a screw for transferring the biomass through the following successive zones:
   a biomass cooking zone provided with a line for conveying the pressed biomass resulting from the second transfer zone and a steam injection line,
   an expansion zone for expanding the biomass resulting from the cooking zone,
   a separation zone for separating the steam from the biomass, 5) an acid liquor preparation zone provided
   with a line conveying the spent liquor drawn off from the second transfer zone to the steam explosion zone and/or a line conveying the spent liquor drawn off from the first impregnation zone,
   with a line conveying the acid and/or a line conveying the water,
   with a line for recycling said prepared acid liquor to the first impregnation zone,
   with a stirring system and
   optionally with a heating means.

* * * * *